United States Patent [19]

Ahlstone

[11] 4,133,557
[45] Jan. 9, 1979

[54] PRELOADED MISALIGNMENT PIPE CONNECTOR

[75] Inventor: Arthur G. Ahlstone, Ventura, Calif.

[73] Assignee: Vetco, Inc., Ventura, Calif.

[21] Appl. No.: 824,072

[22] Filed: Aug. 12, 1977

[51] Int. Cl.² ............................................. F16L 27/06
[52] U.S. Cl. ....................................... 285/39; 29/237; 29/446; 285/93; 285/167; 285/263; 285/297; 285/309; 285/379
[58] Field of Search ................. 285/39, 18, 334.2, 263, 285/309, 310, 167, 379, 380, 93; 29/237, 446

[56] References Cited

U.S. PATENT DOCUMENTS

| | | | |
|---|---|---|---|
| 275,098 | 4/1883 | Walker | 285/167 |
| 1,263,777 | 4/1918 | Langton | 285/167 |
| 2,866,370 | 12/1958 | Biach | 29/446 X |
| 3,141,685 | 7/1964 | Watts | 285/93 |
| 3,350,103 | 10/1967 | Ahlstone | 285/141 X |
| 3,466,738 | 9/1969 | Mount | 285/382.4 X |
| 3,628,812 | 12/1971 | Larralde | 285/334.2 X |
| 3,717,920 | 2/1973 | Oliver et al. | 29/237 |
| 3,848,899 | 11/1974 | Smith | 285/98 |
| 4,012,059 | 3/1977 | Luke et al. | 285/89 X |
| 4,012,060 | 3/1977 | Reneau | 285/93 |

*Primary Examiner*—Thomas F. Callaghan
*Attorney, Agent, or Firm*—Bernard Kriegel; Philip Subkow

[57] ABSTRACT

A misalignment conductor for large pipelines or conductor pipes includes an internal, metal seal ring having an external spherical surface which is axially and circumferentially loaded between opposed internal spherical metal surfaces of connector hubs. Connector body parts engaged with or formed on the pipe connector ends or hubs have spherical surfaces enabling the connector to be made up with the pipe connector hubs disposed over a range of angular misalignment. The sealing ring is preloaded by a loading tool when the connector body parts are secured together to prevent relaxation of the preload on the sealing ring. The metal sealing ring is initially supported on one of the hubs by means enabling angular adjustment of the sealing ring as it is loaded between misaligned hubs.

19 Claims, 6 Drawing Figures

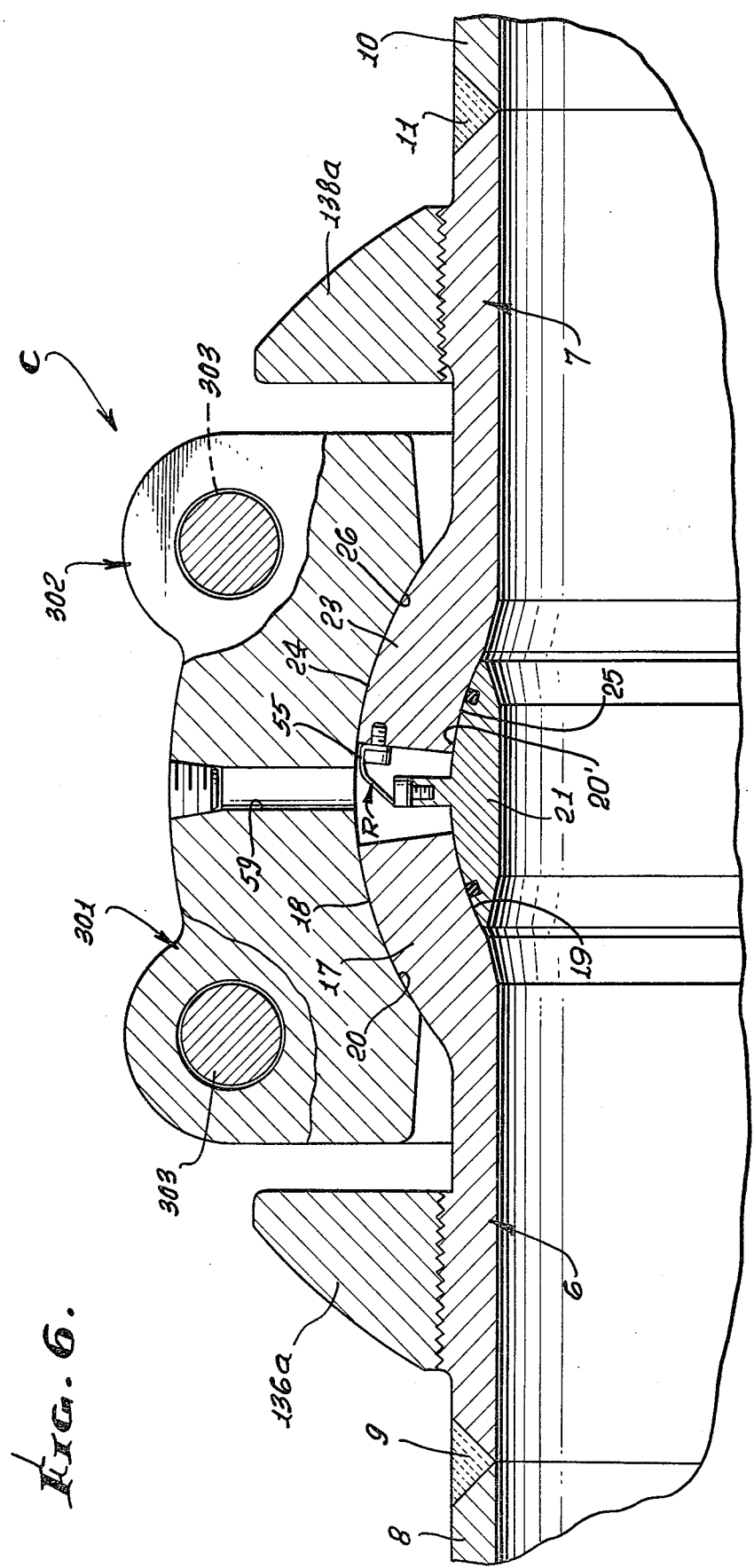

PRELOADED MISALIGNMENT PIPE CONNECTOR

The offshore oil and gas industry has been, and is, more generally adopting the practice of utilizing large subsea pipe lines for gathering and transporting production from wells completed on the floor of the sea at substantial depths. A pipeline may be damaged and require repair in such a subsea environment. A typical repair may involve the very costly installation of a connector which can be made up between pipe sections which are misaligned over a range of angles rendering the make up of flange connections very difficult. On the other hand, in some pipeline systems, regular flanged connectors are used where misaligned connectors would be advantageous and would simplify the make up of connections, even where the pipe is only slightly misaligned.

Such operations performed in a subsea environment by divers with special equipment are very difficult, at best, and as the depth of such pipelines increases, requiring the use of diving bells with manipulative tools for remote makeup, the problems are even more difficult and costly.

Ball and socket connectors for pipe are notorious, wherein a range of angular misalignment between the connector parts can be tolerated, but such connectors for use in subsea pipelines are extremely costly to manufacture and install in the subsea environment. Moreover, when such connectors are of the typical ball and socket type, the seal diameter is quite large requiring very large constraining means to maintain the ball member sealingly engaged in the socket member. The constraining means may also be very difficult to make up sufficiently to provide good tensile and compressive strength in the connector. Such problems are generally not present in various smaller misalignment connectors used in more conventional applications, in pipe which is not subjected to axial loading of any consequence, and wherein freedom to swivel may be desired. Elastomeric or flexible sealing means have also been employed in some ball type or misalignment connectors, but elastomeric or flexible sealing material is not reliable as a seal over a long period of time, as compared with a metal-to-metal seal, or a metal-to-metal seal with an elastomeric flexible backup seal. Where means have been provided for loading the ball and socket members together in subsea misalignment connectors using hydraulic means, the hydraulic equipment, as well as the connectors, have been very elaborate and costly. Elaborate structures have also been provided for eliminating the problem of misalignment of the pipe otherwise than in the connector itself.

Examples of misalignment pipe or fluid line connectors for subsea use and methods for handling pipeline repairs are shown and described in the following U.S. Pat. Nos. 3,658,366 — Apr. 25, 1972 — Welch, Jr., 3,737,179 — June 5, 1973 — White, Jr., 3,780,421 — Dec. 25, 1973 — White, Jr., et al., 3,997,197 — Dec. 14, 1976 — Marsh et al..

Examples of misalignment pipe or fluid line connectors for other uses are shown and described in the following U.S. Pat. Nos. 3,712,645 — Jan. 23, 1973 — Herter, 3,848,899 — Nov. 19, 1974 — Smith.

The present invention provides a connector of the misalignment type having a pair of hubs and an internal, metal sealing ring preloaded together and with the hubs restrained or locked in the positions preloading the seal ring between the hubs either in alignment or misaligned.

An object of the invention is to provide a misalignment connector which is relatively inexpensive and easy to make up in an adverse environment, such as a subsea environment, but which has tensile, compressive and bending strength exceeding the pipe sections connected thereby.

Another object is to provide such a misalignment connector having an internal metal sealing ring initially retained in place with respect to one of the connector hubs, whereby the connector can be easily assembled in a subsea environment by a diver or a manipulative tool from a diving bell.

More particularly, the invention provides a connector of the misalignment type, wherein complemental connector hubs have internal spherical surfaces engaged with an external spherical surface of a metal sealing ring which is preloaded axially and circumferentially, the hubs being held against separation by connector body parts which are adapted to be made up while the spherical surfaces internally of the hubs and on the sealing ring are held preloaded by a loading tool. The loading tool can then be removed from the connector assembly for subsequent use.

In some forms the preload tool is applicable to thrust shoulders on the hubs which capture annular, connectible body parts on the hubs. In another form, the body parts are identical halves applicable laterally to the hubs, in another form the preload tool is applicable to thrust shoulders on the connector parts. In all of the illustrated forms, the preload tool and the thrust shoulders have spherical surfaces enabling preloading of the connector over a range of angles of misalignment.

The metal-to-metal seal between the hubs and the metal sealing ring is backed up by a resilient seal, and the outer connector bodies which hold the hubs in position define with the metal sealing ring and annular chamber into which test fluid, sealant or epoxy can be injected.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 6 is a further view corresponding to FIG. 3 and showing yet another form of the connector.

Figure 1:
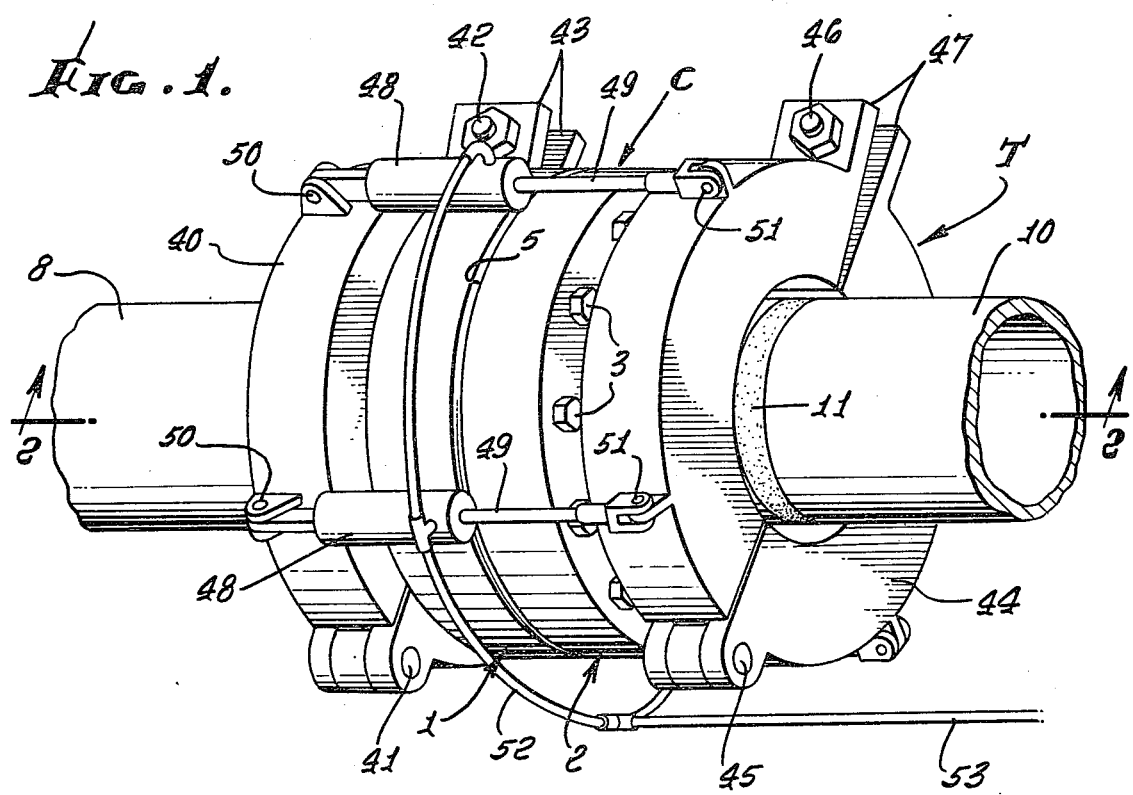
FIG. 1 is a perspective showing a misalignment connector and a loading tool applied thereto.
Figure 2:
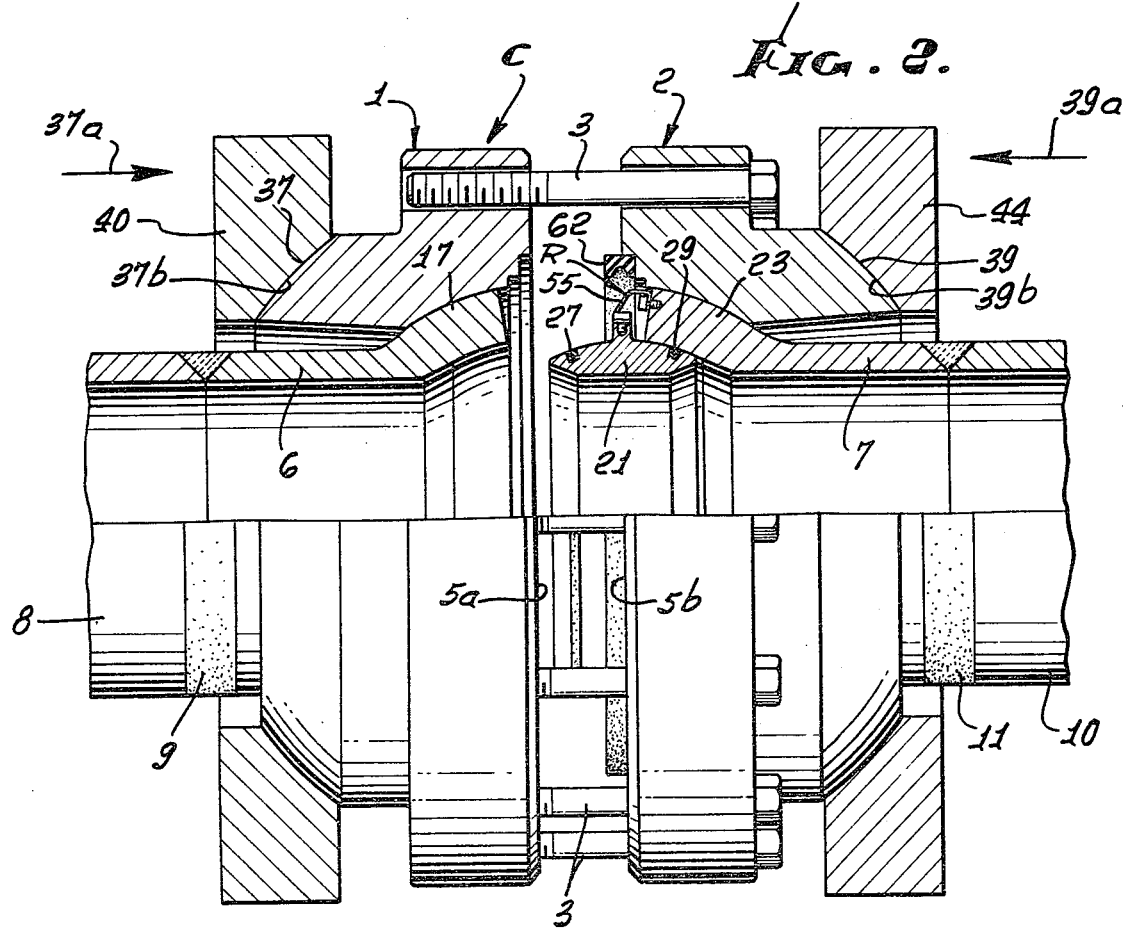
FIG. 2 is a longitudinal section, as taken on the line 2—2 of FIG. 1, with parts of the loading tool removed for clarity, showing one form of the connector assembly prior to preloading of the seal ring.
Figure 3:
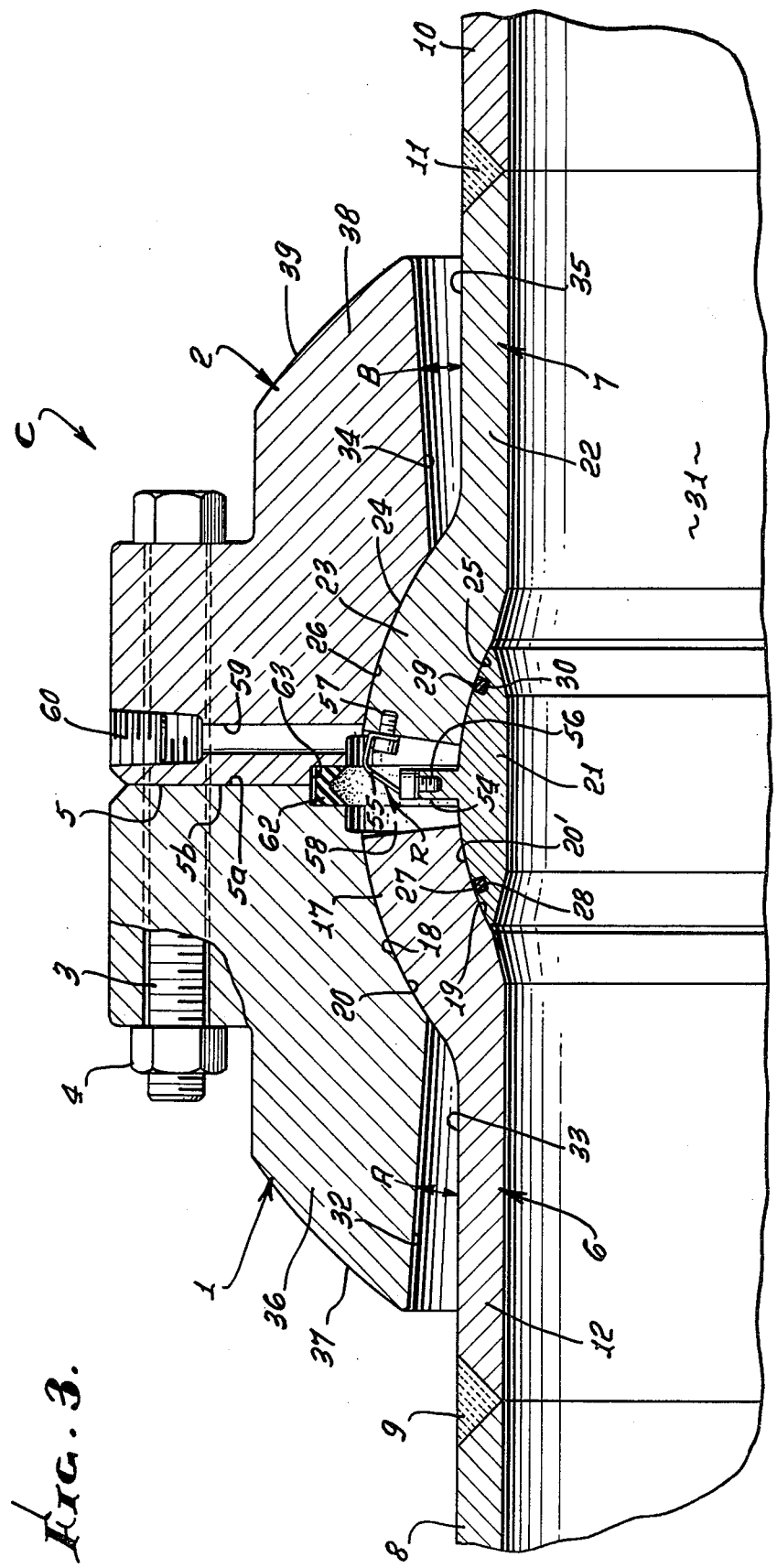
FIG. 3 is a longitudinal quarter section showing the connector parts restrained together.

As seen in the drawings, a pipe connector C, made in accordance with the invention, comprises a pair of complemental connector body parts 1 and 2, in the form shown in FIGS. 1 through 3, comprising a pair of connector flanges, constrained together by circumferentially spaced bolts 3 having nuts 4 threaded thereon, the bolts extending through the flanges and clamping the flanges together at a transverse meeting plane 5 which limits movement of the flanges 1 and 2 towards one another. Within the flanges are a pair of connector hubs 6 and 7, adapted to be moved axially towards one another by the flanges 1 and 2 as the connector is being made up. The connector hub 6 is joined to a length of pipe 8 by a circumferentially continuous weld 9, and the connector hub 7 is joined to another section of pipe 10 by a circumferentially continuous weld 11. The connector hub 6 includes a cylindrical body section 12 formed with an outwardly flaring hub end 17. This hub end 17 has an external spherical surface 18 and an internal spherical surface 19, the external spherical surface 18 being engageable by a companion internal spherical surface 20 provided within the connector flange 1 and the internal spherical surface 19 of the hub end 17 being engageable with the external spherical surface 20' at one side of a metal sealing ring 21.

Correspondingly, in the embodiment illustrated herein, the connector hub part 7 has a cylindrical body 22 provided with an outwardly flared hub end 23, this hub end having an external spherical surface 24 and an internal spherical surface 25, the spherical surface 24 being engageable within the internal spherical surface 26 of the connector flange 2, and the internal spherical surface 25 being engageable with the external spherical surface 20' of the metal sealing ring 21.

When the flanges 1 and 2 are bolted together to move the opposing radial surfaces 5a and 5b thereof into abutting engagement, the co-engaged spherical surfaces 18 and 20 of the flange 1 and the hub end 17 and the corresponding co-engaged spherical surfaces 24 and 26 of the hub end 23 of the flange 2 move the hubs 6 and 7 towards one another and engage the outer peripheral, spherical surface 20° of the metal seal ring 21 between the internal spherical surfaces 19 and 25 of the respective hub ends 17 and 23, so as to axially and circumferentially energize or preload the metalic sealing ring and provide tight metal-to-metal sealing contact between the opposing spherical surfaces of the sealing ring and the hub ends.

A resilient back up seal for the metal-to-metal seal between the respective hubs and the metal sealing ring is provided. An elastomeric sealing ring 27 is disposed between the hub end 17 and the metal sealing ring 21, the elastomeric sealing ring being carried in a circumferentially extended groove 28 provided about the outer periphery of the metal sealing ring 21. An additional elastomeric sealing ring 29 is disposed between the outer spherical surface 20' of the seal ring 21 and the inner spherical surface 25 of the hub end 23 and is disposed in a circumferentially extended groove 30 provided in the outer periphery of the seal ring 21. When the connection is made up, the pressure of fluid within the passage 31, which extends through the connector within the inner periphery of the seal ring 21, can act on the seal ring 21 to pressure load the metal-to-metal sealing surfaces into tight sealing engagement.

It is apparent that while the hubs 6 and 7 are shown in axial alignment with one another, the spherical shape of the inner and outer surfaces of the hub ends 17 and 23 and the spherical outer shape of the seal ring 21, together with the spherical shape of the internal flange surfaces 20 and 26 enable the connector hubs 6 and 7 to be disposed at a range of angles of misalignment. The flange 1 has an internal wall 32 extending longitudinally outwardly from the inner spherical surface 20 and flaring outwardly at an angle A, as shown with respect to the outer cylindrical surface 33 of the connector hub 6. Thus it will be appreciated that the hub 6 can be positioned relative to the flange 1 at a selected angle within the range of angle A, and the companion spherical surfaces of the flange 1 and the seal ring 21 will engage the outer spherical surface 18 and the inner spherical surface 19 of the hub end 17, with the spherical surfaces all loaded against one another and with the seal ring 21 axially loaded towards the connector hub 7. Correspondingly, the connector flange 2 has an internal wall 34 flaring outwardly at an angle B with respect to the outer cylindrical surface 35 of the connector hub 7, enabling angular misalignment of the connector hub 7 through any necessary angle lying within the range of the angle B. Thus, in the form illustrated the connector can be made up with angular misalignment equaling the sum of the angles A and B.

This range of angular misalignment of the connector is accomplished in a structure which is relatively small in diameter as compared with a typical ball and socket connector wherein the total range of angular adjustment is accomplished by the use of a spherical ball surface engaging in a spherical socket and wherein the sealing diameter is accordingly relatively large.

During the making up of misalignment connectors in difficult environments, such as a subsea environment, where typically the tightening of the nuts and bolts 3 and 4 which are spaced circumferentially about the flanges 1 and 2 must be accomplished by divers or by manipulative devices provided by diving bells, the effective loading of the flange faces 5a and 5b together, so as to properly preload the internal metallic sealing ring into metal-to-metal sealing engagement with the internal spherical surfaces of the hubs, becomes very difficult. Not only are the tools for performing such tasks unwieldy in the hands of divers or by manipulators, but the tightening of the fastenings must be accomplished in some sort of circumferential sequence, namely tightening the fastenings successively about the flanges, and then progressively retightening the fastenings until the flanges are properly loaded.

The present invention simplifies the operation of making up the connector C. In this connection, the flange 1 has an outer extension 36, forming the internal angular wall 32, and having at its outer extremity a shoulder or a face 37 which is spherical. Correspondingly, the connector flange 2 has an end extension 38 provided with an end shoulder surface 39 which is spherical. As seen in FIG. 1, a loading tool T is applicable to the opposite spherical flange surfaces 37 and 39 and is adapted to apply an axial force to the respective flanges urging the flanges towards one another and into abutting engagement at the radial faces 5a and 5b.

In the illustrative form, the tool T comprises thrust transmitting means engageable with the respective flanges 1 and 2. The tool includes a first radially split ring 40, composed of ring half parts hingedly interconnected at 41 and adapted to be clamped together by suitable clamping means such as a bolt 42 extending through outstanding ears 43 on the respective ring half parts. A second thrust transmitting, radially split ring 44 is hingedly interconnected at 45 at one side of the ring half parts, and clamped together at the opposite side by a bolt 46 extending through outstanding ears 47 on the respective ring parts. Extending between the rings are a suitable number of circumferentially spaced hydraulic actuator cylinders 48 having rods 49 projecting therefrom, the cylinders being connected at 50 to one of the thrust rings and the rods being connected at 51 to the other thrust ring, whereby the application of hydraulic fluid to the cylinders to retract the rods into the cylinders will apply opposite axial forces to the thrust rings 40 and 44, as indicated by the arrows 37a and 39a in FIG. 2. Suitable hydraulic lines 52 connect the cylinders 48 with a source line 53 to which hydraulic fluid can be supplied from a suitable source, say at a location on the vessel afloat in the water, or form some suitable hand operated pump beneath the sea.

As seen in FIG. 2, the opposing inner sides of the respective thrust rings 40 and 44 have spherical loading surfaces 37b and 39b engageable with the companion spherical thrust surfaces 37 and 39 on the connector flanges 1 and 2, whereby the thrust rings 40 and 44 can engage misaligned connector flanges and draw them towards one another. The connecting bolts 3 can be initially loosely installed when the flanges are drawn towards one another and then finally tightened after the confronting flange faces 5a and 5b have been loaded into abutting engagement. Without requiring illustration herein, it is apparent that if desired, means may be provided for aligning the respective bolt holes in the flanges as they are being drawn together.

During loading of the flanges 1 and 2 towards one another, the confronting spherical surfaces of the metallic seal ring 21 and the opposing hub ends 17 and 23 are moved into engagement and progressively the sealing ring is axially and circumferentially radially energized or loaded to cause a tight metal-to-metal seal between the metallic seal ring and the inner surfaces of the hub ends.

Initial proper positioning of the seal ring 21 with respect to one of the hub ends of the connector, while the other hub end is being moved into engagement with the seal ring is difficult to accomplish in any situation in which the seal ring will not rest within the spherical surface of the hub end by gravity, but the problem is accentuated when the connector is to be made up in a subsea environment. Accordingly, as seen in FIG. 2, retaining means R are provided for initially supporting the seal ring 21 in a position with its peripheral spherical surface 20' in or nearly in engagement with the companion inner spherical surface 25 of the hub end 23. This retaining means is constructed so that the seal ring can be properly engaged by the other hub end 17 throughout the range of permitted angular misalignment of the hub ends and so that the seal ring can partake of the necessary angular and axial motion necessary for the proper preloading or energization of the seal ring 21. Accordingly, the seal ring 21 has a radial support flange 54 projecting outwardly therefrom. The flange 54 may be segmented or may comprise a number of circumferentially spaced projections, but in any event the flange provides a support to which a circumferentially continuous resilient supporting member 55 or a plurality of circumferentially spaced members 55 can be attached by a fastener screw 57 to the end face of the hub end 23. The support member 55 may be of any suitable construction, but is preferably constructed in accordance with my application for U.S. patent filed concurrently herewith, Ser. No. 823,919, filed Aug. 12, 1977, whereby the seal ring 21 is flexibly supported to enable it to partake of the necessary axial and/or angular motion previously referred to. It will also be noted that the flange 54 has opposite side faces 54a and 54b opposed by end faces 17a and 23a of the hubs 17 and 23. Thus, angular misalignment of either hub will cause its end face to engage a side face of the flange 54 to cause angular movement of the seal ring with respect to the other hub. In the event that the flange 54 is sufficiently wide as to be engaged between the two hub ends, at an angle of misalignment less than the sum of the angles A and B, then such engagement constitutes a limit to the maximum permissible angularity.

Between the seal ring 21, the flanges 1 and 2 and the opposing ends of the hub ends 17 and 23 there is formed an annular space 58. One of the flanges, the flange 2 in the illustrated embodiment, has a radial port 59 adapted to be closed by a screw threaded plug 60 at the outer end thereof. This port 59 enables the performance of an external pressure test of the sealing effectiveness of the sealing ring 21 and also enables the injection of a suitable sealant or epoxy into the chamber 58. The chamber 58 is sealed between the confronting spherical surfaces of the flange, the hub ends and the sealing ring, and in addition, the chamber 58 is sealed between the confronting flange faces 5a and 5b, either by facial contact or by a suitable resilient seal ring 62 seated in an annular groove 63 formed between the flanges. Such a seal ring can be initially held in place in one of the flanges until the connector is made up. In the event that epoxy material is injected into the chamber 58, curing of the epoxy material will provide a rigid body between the confronting ends of the hub ends 17 and 23, thereby locking the connector assembly against any angular movement after the epoxy has cured and providing the connector with compressive strength in excess of the ability of seal ring 21 to withstand loading inwardly.

Figure 4:
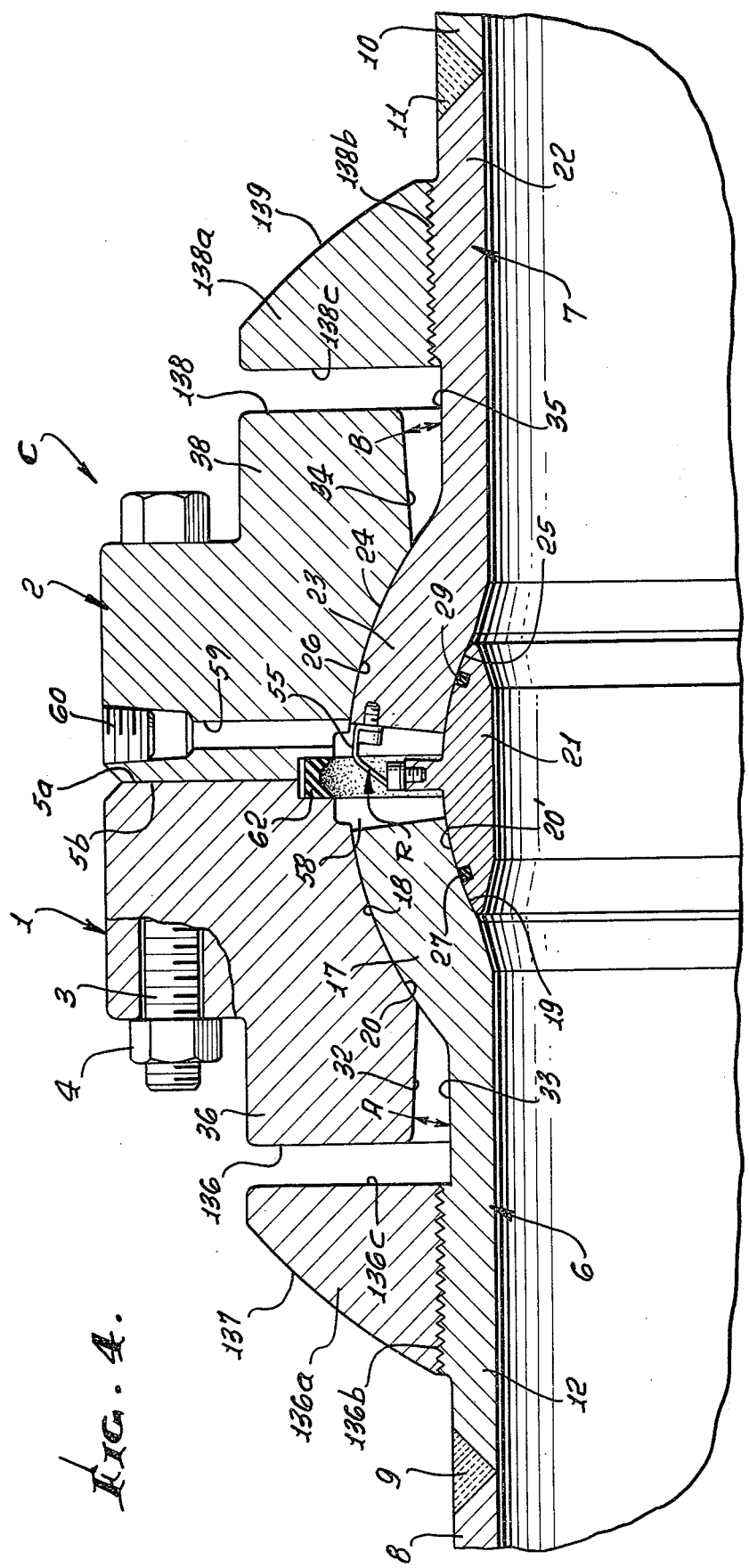
FIG. 4 is a view corresponding to FIG. 3, but showing another form of the connector.

Referring to FIG. 4, another form of the connector C is illustrated, which in most respects corresponds to that previously described, and therefore, corresponding reference numerals have been applied to the similar components. In this form, however, the preload force applied to initially make up the connector, at any selected angle within the permissible range, is applied to the hub parts 6 and 7 directly, instead of being applied through the body parts 1 and 2 and then to the hub parts through the coengaged spherical surfaces 18 and 20 between the body part 1 and the hub end 17 and the spherical surfaces 24 and 26 between the body part 2 and the hub end 23.

In this form the axial body extension of the flange 1 is of reduced length, terminating in a transversely extended surface 136, and an annular flange 136a is removably connected to the cylindrical section 12 of the hub part 6. This flange 136a has an abutment surface 137 engageable by the internal surface 37b of the thrust ring 40 of the loading tool T previously described. The flange 136a is removably secured to the cylindrical body 12 of the hub 6 by means of a threaded connection 136b, and is applied after the flange 1 has been installed over the end of the cylindrical portion 12, so that thereafter the flange 1 is captive on the flange end 17 between the outer spherical surface 18 thereof and the confronting flange surface 136 and thrust ring surface 136c.

Correspondingly, the axial extension 38 on the connector flange 2 terminates in a transversely disposed surface 138, and a thrust ring 138a is removably secured to the cylindrical body section 22 of the connector hub 7 and provides an outwardly projecting thrust surface 139 engageable by the internal thrust surface 39b of the thrust ring 44 of the loading tool T. The thrust ring 138a is applicable to the connector hub body 22 by a threaded connection 138b, following movement of the connector flange body part 2 onto the hub end 23, and thereafter the connector flange or body part 2 is captive on the hub end 23 between the outer spherical surface 24 thereon and the inner transversely extended surface 138c on the thrust ring 138a. The space between the confronting surfaces of the thrust rings 136a and 138a and the respective opposing ends of the connector body parts 1 and 2 is such as to enable the hubs to partake of the necessary angular motion with respect to their connector body parts 1 and 2. As in the previously described embodiment, the angle A between the inner peripheral surface 32 of the extension 36 of the flange body 1 and the opposing cylindrical surface 33 of the hub 6 limits the range of angular misalignment permitted within the one half of the connector assembly, and the angle B between the inner peripheral surface 34 of the connector body part 2 and the outer cylindrical surface 35 of the connector hub 7 limit the range of angular misalignment of the hub 7 within the connector body part 2, whereby the total range of angular misalignment of the assembled connector is the sum of the angles A and B. If desired, however, the respective thrust rings 136a and 138a may be threadedly adjusted towards the confronting faces 136 and 138 of the flange body parts 1 and 2, so that abutting engagement therewith will limit the range of angular misalignment of the connector C.

In making up the connector C of FIG. 4, the connector subassemblies can be relatively positioned, with the connector body parts 1 and 2 captive upon the respective hubs 6 and 7, and with the metal sealing ring 21 shiftably supported by the resilient support 55 in position with respect to the hub end 23 for proper coengagement between the hub ends 17 and 23. The loading tool T can then be applied to the thrust shoulders or surfaces 137 and 139 of the thrust rings 136a and 138a and clamped about the connector parts. When the tool actuators are telescopically retracted, upon the application of pressure fluid thereto, the hubs 6 and 7 will be drawn towards one another and into engagement with the sealing ring 21 to axially and circumferentially preload the latter between the opposing spherical surfaces 19 and 25 on the hub ends and the spherical surfaces provieded about the outer periphery of the sealing ring 21. Thereafter, the connector body parts 1 and 2 can be moved into initial positions enabling the retainer bolts 3 and the application of the nuts 4 so that the connector body flanges can be secured in place in abutting relation at the transverse faces 5a and 5b. When the body parts 1 and 2 are fastened together, the respective internal spherical surfaces 20 and 26 therein are in engagement with the complemental spherical surfaces 18 and 24 on the hub ends 17 and 23. The loading tool can then be removed and suitable pressure tests performed by pressurizing the chamber 58 between the complemental connector parts externally of the metal seal ring 21 and sealant can be injected into the chamber 58. If desired, the sealant may be an epoxy material which will cure forming a rigid member between the opposed ends of the hubs.

Figure 5:
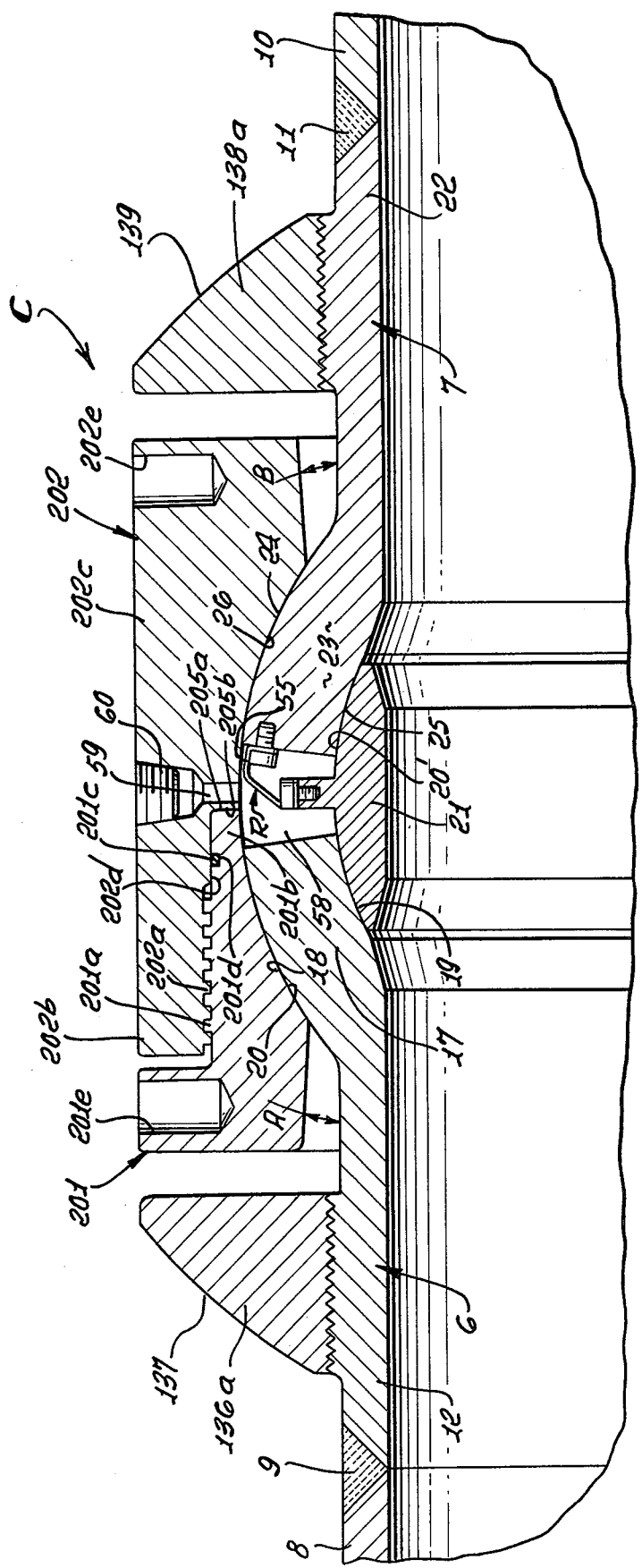
FIG. 5 is another view corresponding to FIG. 3, showing still another form of the connector.

Referring to FIG. 5, another form of the invention is illustrated wherein, as in the case of the form shown in FIG. 4, the hubs 6 and 7 have the thrust rings providing the thrust shoulders 137, 139 threadedly connected to the tubular sections 12 and 22 of the respective hubs. In this form, however, the pair of body parts 201 and 202, which are captive upon the hub ends 17 and 23 are in the form of respective male and female threaded sleeves. The male sleeve 201 has the internal spherical surface 20 engaged with the external spherical surface 18 of the hub end 17, while the female threaded sleeve 202 has the internal spherical surface 26 engageable with the external spherical surface 24 on the hub end 23. The sleeve 201 is externally threaded at 201a for engagement with the internal threads 202a on the interior of a cylindrical section 202b which extends axially from the body section 202c of the body part 202. Within the cylindrical section 202b of the body part 202 is a sealing bore 202d into which extends a cylindrical end section 201b formed on the sleeve 201, the cylindrical extension 201b carrying an elastomeric seal ring 201c in an annular groove 201d, whereby to provide a seal preventing leakage of fluid from the chamber 58 defined between the body parts, the hub parts, and the internal metal sealing ring 21.

The respective threaded sleeves 201 and 202 are provided with suitable tool receiving formations, such as spanner wrench receiving sockets 201e and 202e, whereby when the joint is to be made up the sleeves can be relatively rotated to bring them together in abutting engagement between the transversely extended surfaces 205a and 205b provided on the respective body parts 201 and 202 whereby axial movement of the body parts is limited to a position at which the opposed spherical surfaces 18 and 20 between the body part 201 and the hub 17 and the spherical surfaces 24 and 26 between body part 202 and the hub end 23 are properly loaded together.

In making up of the connector C according to FIG. 5, the complemental connector sub-assemblies can be moved into proximity throughout a range of permitted misalignment, with the connector body sleeves 201 and 202 captive between the hub ends 17 and 23 and the respective thrust rings 136a and 138a. Thereupon the preloading tool T can be applied to the thrust rings to engage the spherical thrust surfaces 137 and 139 thereon, so that upon the application of pressure fluid to the loading tool actuators the hubs 6 and 7 will be forced towards one another and into preloading engagement with the internal metal sealing ring 21. Thereafter, the threaded body sleeves 201 and 202 can be made up by the utilization of a suitable spanner applicable to the sleeves to rotate the same, to restrain the hub ends in their correct sealing engagement with the internal seal ring. The flexible connection between the seal ring 21 and the hub end 23, as previously described, permits the seal ring to partake of such axial and relative angular movement as may be required by the misalignment of the pipes being joined, within the limits of the angles A and B between the hub 6 and the body part 201 and between the hub 7 and the body part 202. Following removal of the loading tool, the effectiveness of the seal can be tested through the test port 59 communicating with the chamber 58 defined between the body parts, the hub ends and the internal sealing ring, and a suitable sealant or epoxy materials can be injected into the chamber 58.

Referring to the form of the connector C shown in FIG. 6, the hubs 6 and 7, as in the case of the embodiments shown in FIGS. 4 and 5 have the thrust receiving means engageable by the tool T applied thereto, the hub 6 having the thrust ring 136a threaded thereon and the hub 7 having the thrust ring 138a threaded thereon. The structure of the hub ends 17 and 23 as well as the structure of the internal metal sealing ring 21 corresponds to that previously described. In this case, however, the complemental body parts 301 and 302, instead of being formed as an annular body parts meeting on a transverse plane, are half body parts which meet on a longitudinally extended plane. The body half parts 301 and 302 are true half parts, in that each of them extends circumferentially a full 180° so as to enable tight abutting engagement between the opposed longitudinally extended surfaces thereof, upon the installation of transversely extended retainer bolts 303 through the bolt holes formed in opposite ends of the respective body parts. In this form it will be apparent that each body half 301 and 302 will have a semi-circular portion of the respective internal spherical surfaces 20 and 26 which are adapted to engage the external spherical surfaces 18 and 24 on the hub ends 17 and 23. It will also be apparent that in this form the body parts are not captive upon the hub ends.

During the making up of the connector C according to FIG. 6, the loading tool can be applied to the thrust rings 136a and 138a, after the companion connector hubs 6 and 7 have been initially positioned with respect to one another, with the seal ring 21 supported in place by the resilient support 55, which enables the seal ring to partake of such axial and angular motion as may be necessary during the preloading thereof as the hubs 6 and 7 are drawn together by the loading tool. Thereafter, the body half parts 301 and 302 can be laterally applied to the preloaded and positioned hub ends 17 and 23. It should be appreciated that in order to enable lateral application of the body parts 301 and 302, according to this form, the actuator cylinders of the loading tool may be simply a pair of cylinders at diametrically opposite locations on the ring to allow the freedom of lateral application of the body parts. After the body parts have been placed upon the hub ends 17 and 23 the bolts 303 can be applied to secure the body parts together in face to face relation at the longitudinally extended meeting plane, so that the connector is held against relaxation upon release of the loading tool. Here again if desired, one of the body parts may have the radially opening passage or port 59, permitting the injection of a sealant or an epoxy material or the performance of a test of the efficiency of the seal 21.

From the foregoing it will now be apparent that the several forms of the present invention provide a misalignment connector which is adapted to be made up under adverse conditions, such as subsea conditions, wherein the loading of the connector subassemblies together can be simply and readily accomplished by the utilization of a recoverable loading tool, and the application of the restraining body parts to the hub ends is a simple procedure and is not relied upon to apply the preload force to the internal sealing ring 21. It will be noted that all of the spherical surfaces of the seal ring, the hubs, the body parts and the pre-loading tool are preferably formed on a common center, as shown, whereby all loading is uniformly distributed when the connector is made up.

I claim:

1. A misalignment connector comprising: a pair of metal hub parts having flared ends provided with internal and external spherical surfaces; an internal metal sealing ring having external spherical surfaces engaged by the internal spherical surfaces of said hubs and axially and circumferentially pre-loaded thereby; restraining means including a pair of complemental connector body parts having internal spherical surfaces engaged with said external spherical surfaces on said hubs; one of said pair of parts having oppositely facing thrust surfaces engageable by a loading tool for pre-loading said sealing ring; and means applicable to said pair of body parts while said sealing ring is pre-loaded by said loading tool for interconnecting said pair of body parts and holding all of said spherical surfaces in loaded engagement upon removal of said loading tool.

2. A misalignment connector as defined in claim 1; all of said spherical surfaces having a common center.

3. A misalignment connector as defined in claim 1; said thrust surfaces being spherical, all of said spherical surfaces having a common center.

4. A misalignment connector as defined in claim 1; said hub parts having said oppositely facing thrust surfaces.

5. A misalignment connector as defined in claim 1; said hub parts having said oppositely facing thrust surfaces, said thrust surfaces being spherical, all of said spherical surfaces having a common center.

6. A misalignment connector as defined in claim 1; said hubs having circumferentially extended flanges thereon providing said oppositely facing thrust surfaces for pre-loading said sealing ring prior to loading of said internal spherical surfaces of said body parts against said external spherical surfaces of said sealing ring by said inter-connecting means.

7. A misalignment connector as defined in claim 1; said hubs having circumferentially extended flanges thereon providing said oppositely facing thrust surfaces for pre-loading said sealing ring prior to loading of said internal spherical surfaces of said body parts against said external spherical surfaces of said sealing ring by said inter-connecting means, said thrust surfaces being spherical, all of said spherical surfaces having a common center.

8. A misalignment connector as defined in claim 1; said hubs having circumferentially extended flanges thereon providing said oppositely facing thrust surfaces for pre-loading said sealing ring prior to loading of said internal spherical surfaces of said body parts against said external spherical surfaces of said sealing ring by said inter-connecting means, said pair of body parts extending about said hub ends between said flanges.

9. A misalignment connector as defined in claim 1; said hubs having circumferentially extended flanges thereon providing said oppositely facing thrust surfaces for pre-loading said sealing ring prior to loading of said internal spherical surfaces of said body parts against said external spherical surfaces of said sealing ring by said inter-connecting means, said pair of body parts being in the form of annular members extended about said hub ends between said flanges and having opposed abutting, transverse surfaces, said means inter-connecting said pair of body parts holding said radial surfaces in engagement.

10. A misalignment connector as defined in claim 1; said hubs having circumferentially extended flanges thereon providing said oppositely facing thrust surfaces for pre-loading said sealing ring prior to loading of said internal spherical surfaces of said body parts against said external spherical surfaces of said sealing ring by said inter-connecting means, said pair of body parts being in the form of annular members extended about said hub ends between said flanges and having opposed abutting transverse surfaces, said hub ends, said sealing ring, and said members defining an annular space sealed at said transverse surfaces and by the inner spherical surfaces of said hub ends and the outer spherical surfaces of said sealing ring, one of said members having a port leading from the exterior thereof to said annular space.

11. A misalignment connector as defined in claim 1; said hubs having circumferentially extended flanges thereon providing said oppositely facing thrust surfaces for pre-loading said sealing ring prior to loading of said internal spherical surfaces of said body parts against said external spherical surfaces of said sealing ring by said inter-connecting means, said body parts being in the form of a pair of complemental axially divided members extending circumferentially about said hub end, said inter-connecting means comprising transversely extended threaded fasteners engaged with said members.

12. A misalignment connector as defined in claim 1; said hubs having circumferentially extended flanges thereon providing said oppositely facing thrust surfaces for pre-loading said sealing ring prior to loading of said internal spherical surfaces of said body parts against said external spherical surfaces of said sealing ring by said inter-connecting means, said body parts being in the form of a pair of complemental axially divided members extending circumferentially about said hub ends, said inter-connecting means comprising transversely extended threaded fasteners engaged with said members, said members having longitudinally extended abutting surfaces, said hub ends, said sealing ring, and said members defining an annular space sealed at said abutting surfaces and by the inner spherical surfaces of said hub ends and the outer spherical surfaces of said sealing ring, one of said members having a port leading from the exterior thereof to said annular space.

13. A misalignment connector as defined in claim 1; said body parts having said oppositely facing thrust surfaces for loading said body parts towards one another and to engage said internal spherical surfaces in said body parts with said external spherical surfaces of said hub ends and pre-load said sealing ring between said hub ends.

14. A misalignment connector as defined in claim 1; said body parts having said oppositely facing thrust surfaces for loading said body parts towards one another and to engage said internal spheical surfaces in said body parts with said external spherical surfaces of said hub ends and pre-load said sealing ring between said hub ends, said thrust surfaces being spherical, all of said spherical surfaces having a common center.

15. A misalignment connector as defined in claim 1; said body parts having said oppositely facing thrust surfaces for loading said body parts towards one another and to engage said internal spherical surfaces in said body parts with said external spherical surfaces of said hub ends and pre-load said sealing ring between said hub ends, said pair of body parts being in the form of annular members extended about said hub ends and having opposed abutting transverse surfaces, said hub ends, said sealing ring, and said members defining an annular space sealed at said transverse surfaces and by the inner spherical surfaces of said hub ends and the outer spherical surfaces of said sealing ring, one of said members having a port leading from the exterior thereof to said annular space.

16. A misalignment connector as defined in claim 1; said hubs having circumferentially extended flanges removably secured thereon providing said oppositely facing thrust surfaces for pre-loading said sealing ring prior to loading of said internal spherical surfaces of said body parts against said external spherical surfaces of said sealing ring by said inter-connecting means.

17. A misalignment connector as defined in claim 1; means initially shiftably supporting said sealing ring on one of said hub ends for axial and angular movement with respect to hub ends upon engagement of said internal spherical surfaces of said hub ends with the external spherical surfaces of said sealing ring.

18. A misalignment connector as defined in claim 1; elastomeric sealing means between said internal spherical surfaces of said hub ends and said external spherical surfaces of said sealing ring.

19. A misalignment connector as defined in claim 1; one of said pair of parts having said oppositely facing thrust surfaces engageable by a loading tool for preloading said sealing ring, and including a loading tool having thrust means engaged with said shoulders, and means releasably mounting said loading tool on said connector.

* * * * *